UNITED STATES PATENT OFFICE.

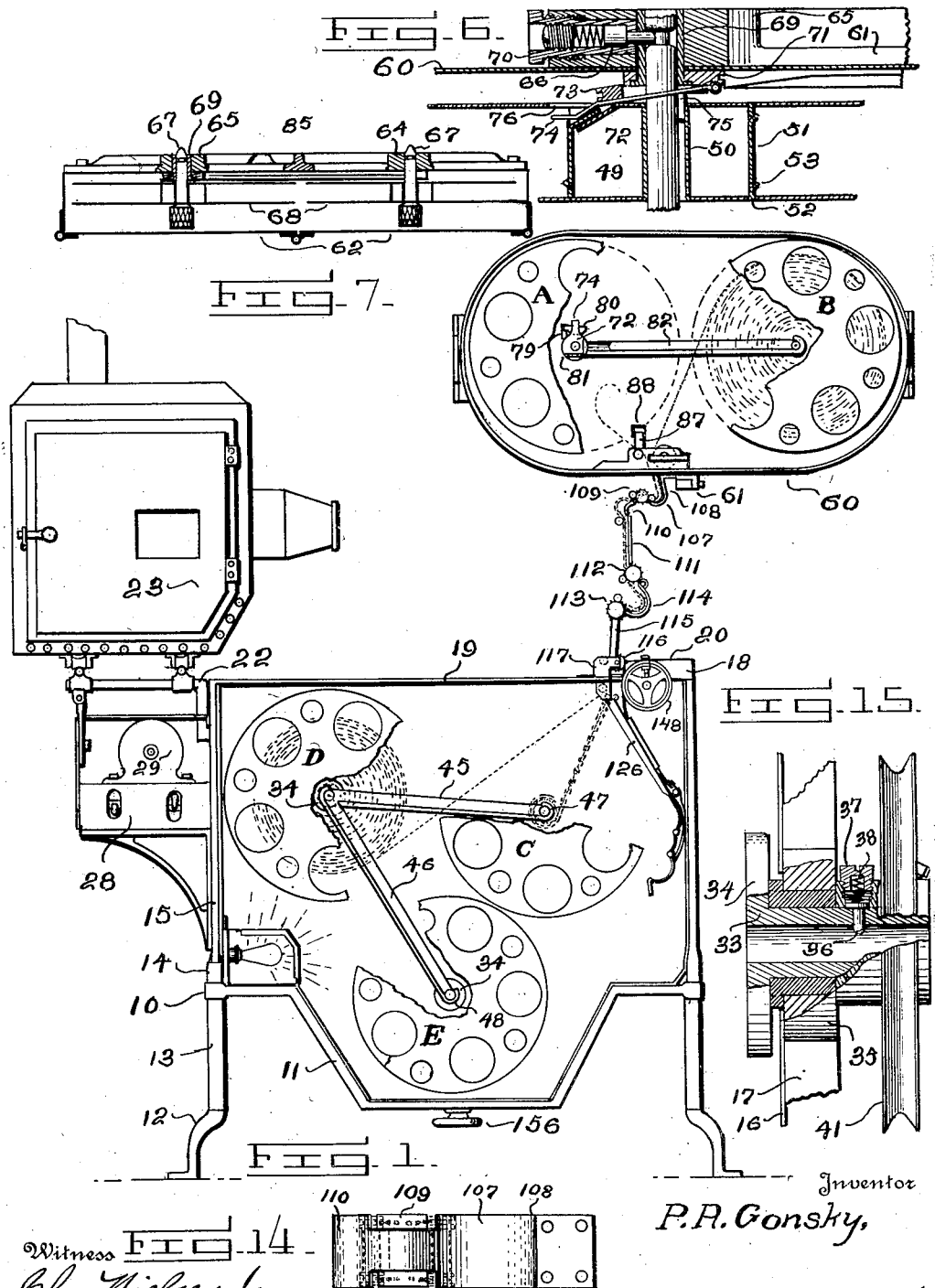

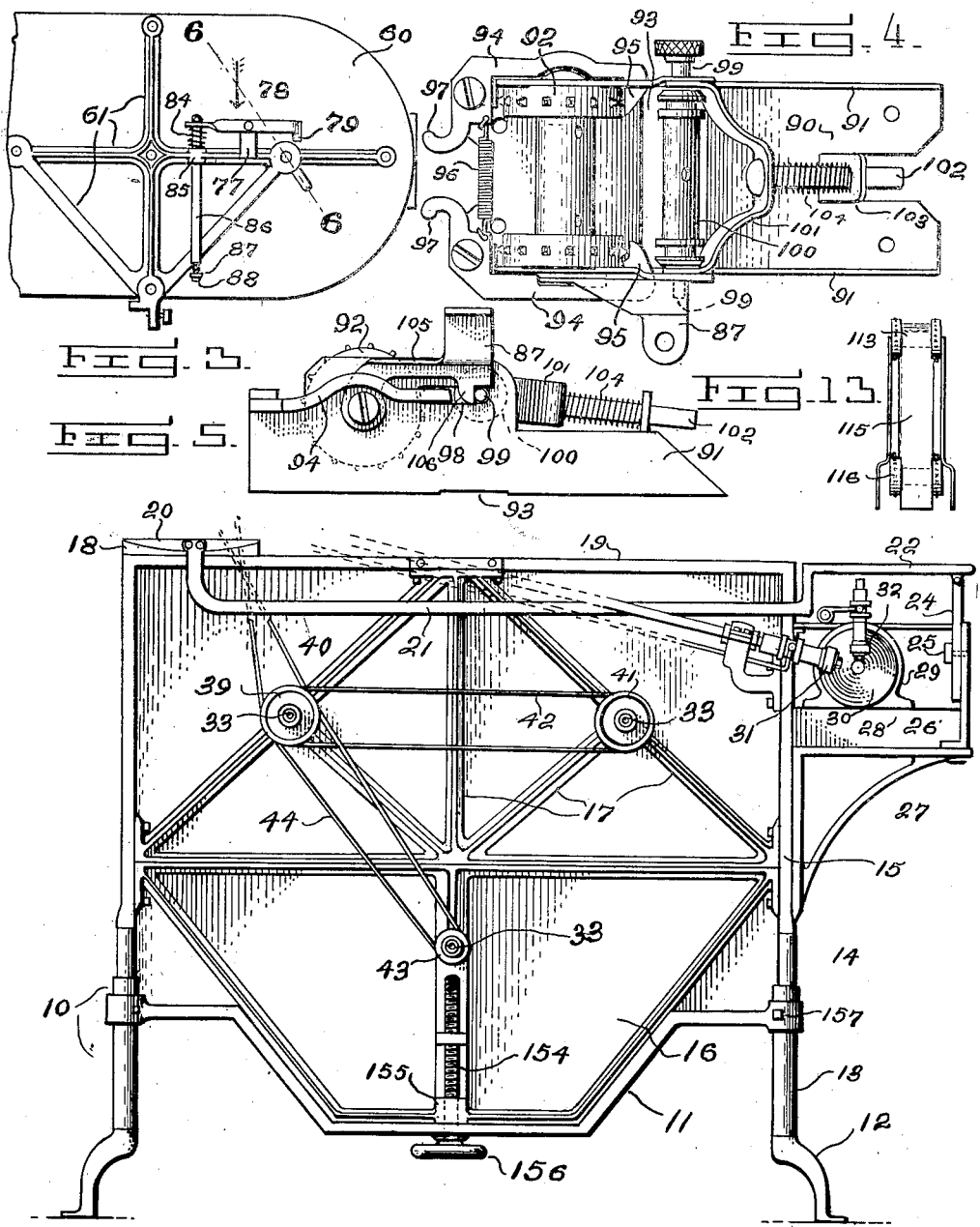

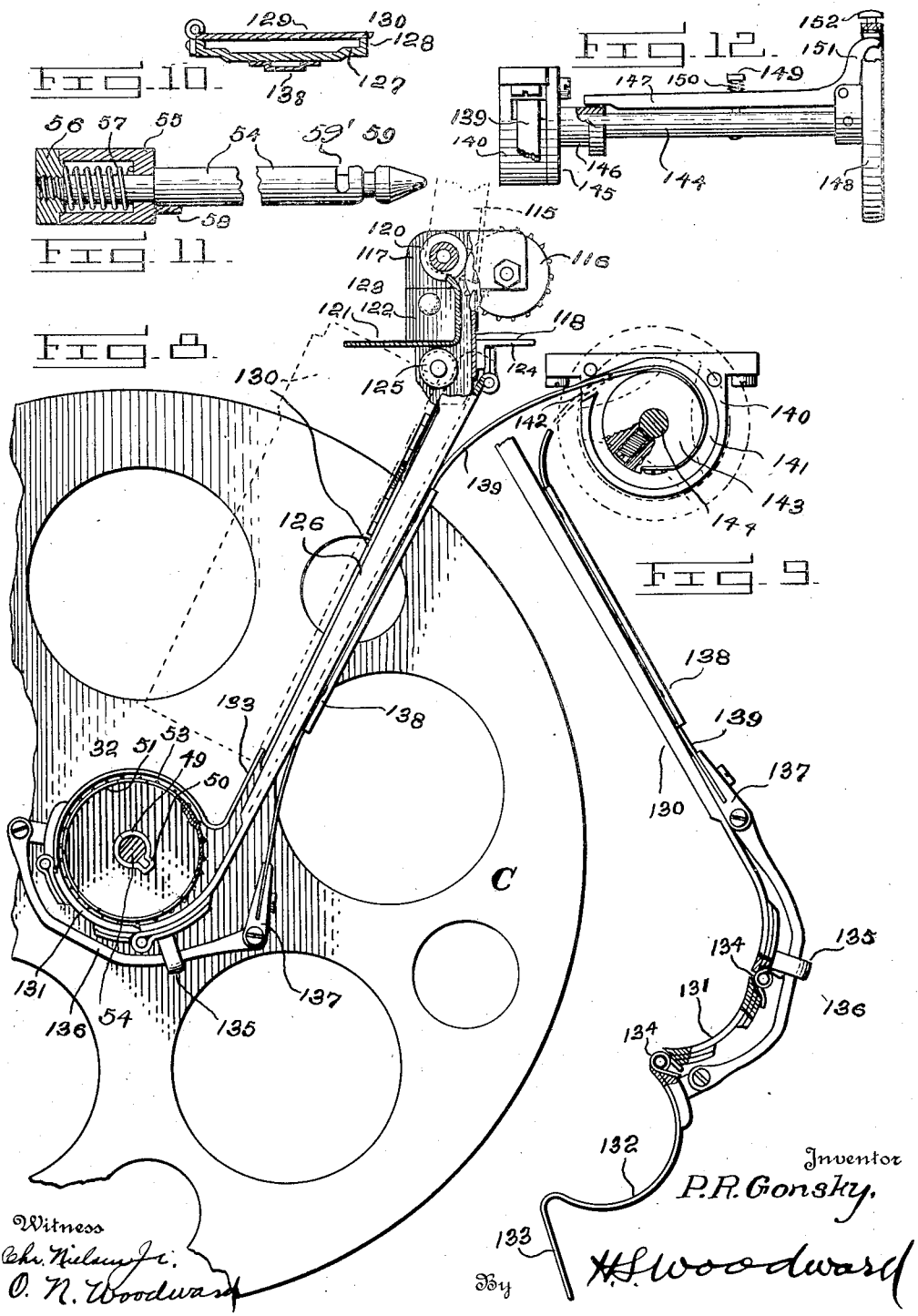

PETER R. GONSKY, OF EDMONTON, ALBERTA, CANADA, ASSIGNOR, BY DIRECT AND MESNE ASSIGNMENTS, TO ENDLESSGRAPH MANUFACTURING COMPANY, OF DETROIT, MICHIGAN.

AUTOMATIC THREADING-MACHINE, TAKE-UP AND REWINDING MECHANISM.

1,260,185.   Specification of Letters Patent.   Patented Mar. 19, 1918.

Application filed July 3, 1916. Serial No. 107,379.

*To all whom it may concern:*

Be it known that I, PETER R. GONSKY, a subject of the King of England, residing at Edmonton, in the Province of Alberta, and Dominion of Canada, have invented certain new and useful Improvements in Automatic Threading-Machines, Take-Up and Rewinding Mechanism, of which the following is a specification.

The invention has for an object to obviate delay in threading the film through moving picture machines as at present constructed, or operating upon similar principles, so that instead of the operator being required to open the machine and shift the guide rollers while the film is laid therebetween, it will only be necessary for the operator to turn the crank, or to continue the operation of the motor, as the case may be, the film being automatically carried from the upper magazine through the feeding devices and intermittent mechanism, necessary loops being formed and the end of the film after passing the projecting mechanism will be adjusted and wound upon a take-up reel. It is an especially important object to provide automatic means for accomplishing the last mentioned functions:—that is, for introducing the end of the films upon the take-up reel in the lower magazine and causing winding thereof properly, without requiring any manipulation whatever of the films. It is also an object of the utmost importance to enable the acomplishment of all the above mentioned actions without requiring the application of hooks or any other connecting devices to the film, at either end.

A very important object and valuable attainment of the invention is the securement of the film end upon the reel hub without the use of clips, but with adequate security to insure the film against slipping, and at the same time leaving the ends free to pass from the reel without liability of being torn or injured in any way.

The principal aim of the invention is to provide means whereby when one film has been exhibited, and the terminal end thereof is about to pass through the motion picture machine, the end of the next film to be exhibited will be automatically started and threaded through the machine and wound onto a separate take-up reel from that upon which the preceding reel is being wound, all without any operation or action on the part of the attendant or operator, except the operation of the usual crank handle, if the machine be hand operated, otherwise the operation is accomplished without any effort whatever, on the part of the operator. Thus, one operator and one machine may now supplant two.

In providing such an invention it is necessary, and it is one of the objects of the invention, to give an efficient device for holding the end of a film in position for starting through the machine and to so start the film when desired, and to also provide a mechanism operable or controlled by a film passing through the machine to cause threading operation of the device.

It is a further important aim to give an efficient means for properly causing the initial end of a film to pass properly through the feeding and intermittent mechanism of the machine and to form the necessary loops properly, without liability of the film becoming jammed or improperly directed. Also to give a desirable device for insuring the guidance of the film end to one take-up reel, and its adjustment thereof for winding while another film is being wound upon a separate reel in the same machine after passing through the intermittent and feeding mechanisms of the projecting machine.

In attaining the automatic action of the machine, it is the purpose to enable the use of one machine, where two machines had been previously employed. That is to say, at present, owing to the manifold operations required of the machine operator, it is necessary for each theater in order to avoid delays and consequent loss, to have two machines, one of which is being gotten ready by one operator to exhibit a film while the other machine is being operated by another operator to exhibit a film, and as soon as the terminal end of the film passes through one machine, the shutter thereon is closed and the mechanism stopped while the other machine is immediately started to exhibit the next film upon the same screen. In the present method, much time is required in attaching the film ends to the reels for the take-up, and after the display of a film is concluded, more time is required in transposing the extra reel from the upper magazine to the lower and moving the loaded reel from the lower magazine to a rewinding device, adjusting the exposed films on the empty reel of the rewinder, and operating the rewinding device. In eliminating the necessity for the two machines and enabling the use of one operator to conduct an exhibition continuously, with a repetition of the program as often as desired, it is necessary to provide in my device, and it is one of its important purposes to give, a construction whereby the loaded reel in the lower magazine may be quickly shifted and the film rewound upon another reel, without the operator leaving the machine, and without interfering with the proper operation of the projecting machine, whether hand operated or machine operated. It is also the aim to enable the continuous introduction of new reels of film into the upper magazine and the adjustment of the threading device to lead these into the film therefrom to the machine, while the machine is continuously in operation, without intermission, this work being performed by the one operator, who may if desired remove the rewound film from the lower magazine and introduce it into the upper magazine immediately, while the machine is in operation.

An important aim of the invention is to give an embodiment of the device adaptable to ordinary moving picture projecting machines as now constructed and used, without modification of their mechanism, and without requiring additions to the operative parts, gear trains, or otherwise.

An important aim of the invention specifically in this invention is to give a novel and desirable device for holding and projecting the end of a film into the projecting machine, under action of a film in course of exhibition, and operable thereby upon conclusion of its unwinding from the upper reel.

A further important object is to give an improved construction in a device for enabling the shifting of a newly started reel in the upper magazine while the machine is in operation, and similarly applicable in the lower magazine to enable the shifting of a take-up reel while partly filled, without deficiency in the take-up. It is also a purpose to give a desirable embodiment of the device for attaching film ends to the reel, which may be operated at will from the exterior of the magazine, and which may be positioned normally clear of the take-up reel so that there will be no liability of interference with proper action of the reel.

Many additional objects are contemplated, and additional features of invention are latent in the device as will appear from the construction, arrangement, and combination of parts hereinafter described, and shown in the drawings, wherein, Figure 1 is an elevation of the right hand side of an apparatus constructed in accordance with my invention, the full mechanism of the projecting means being omitted, and merely the feed sprockets and intermittent sprockets illustrated in their customary relation, the machine being applicable also to other forms of such mechanism by obvious adaptations of the elements herein shown or indicated.

Fig. 2 is a view of the left hand side of the stand and lower magazine only,

Fig. 3 is a detail of the left hand side of the upper magazine,

Fig. 4 is a detail top view of the film starter, full size,

Fig. 5 is a side elevation thereof, in full size.

Fig. 6 is a sectional view of the reel and mounting in the upper magazine, whereby a releasing device will be permitted to operate when a film is unwound from the reel.

Fig. 7 is a horizontal sectional view of the upper magazine.

Fig. 8 is a detail of the device in the lower magazine for guiding and adjusting the film end upon the take-up reel in position for guiding a propelled film end.

Fig. 9 is a view of the swinging guide element shown in Fig. 8, in retracted position, operated from the same center upon which the element is pivoted in Fig. 8, and in the corresponding relation to the operating device.

Fig. 10 is a cross sectional view of the swinging guide element, immediately of its length, Fig. 11 is a detail of the spindle for the take-up and rewinding reels, Fig. 12 is a detail of the operating wheel for the swinging guide element in the lower magazine, Fig. 13 is a detail elevation of the guide from the lower feed sprocket of the projecting machine mechanism to the lower magazine, Fig. 14 is a top view of the guide element from the upper magazine to the aperture plate.

There is illustrated in Figs. 1 and 2 a stand 10, of suitable construction, including a base 11 having four feet 12, into the shanks 13 of which there are set slidably the legs 14 of an upper portion 15 of the stand, which includes a magazine casing 16, in which the take-up reels and the rewinding reel are located. The frame of the upper section includes suitable bracing elements 17 at the rear or left hand side, and the housing 16 is left open at the front side to be closed by any suitable kind of door.

The stand is suitably provided with a base plate 18 mounted upon a table piece 19 forming a part of the stand, the top of the plate 18 being concentric with an axis extending transversely of the stand at a suitable height thereabove, and set in this concave surface there is an oscillating plate 20, suitably constructed to permit a projecting machine to be secured thereon. An arm 21 is connected to the rear side of the plate 20, and extends beside the left hand side of the frame to the rear end thereof, where suitable lamp supporting rods 22 are mounted thereon, upon which the lamp 23 is mounted, which may be of any usual construction. At the outer end of the rods 22 there is provided an adjusting and securing link 24, longitudinally slotted and having a set screw 25 engaged therethrough in an arm 26, mounted upon a bracket 27, secured upon the end of the frame.

The bracket 27 supports a suitable switch box 28 and a motor 29, having a friction wheel 30 from which driving connections are made with the projecting machine at the forward end of the stand, in the usual manner, in the present instance the longitudinally reciprocable friction wheel 31 is shown for this purpose, and at 32 a similar wheel is shown, by which the driving connections may be made with the lamp.

Within the housing 16 there are provided three winding reel mountings, suitably journaled in the bracing elements 17 of the back frame of the stand. This mounting in the present instance comprises in this particular embodiment of the invention a journaled sleeve 33, having a thrust bearing flange 34 within the casing and immediately adjacent the rear side thereof, this sleeve being mounted revolubly in a suitable bearring boss 35 mounted in the rear element 17 of the frame. Rearwardly of the housing pulleys are engaged upon the sleeve 33, and upon each sleeve there is mounted a spring pressed pin 36, projecting into the sleeve a short distance for engagement with a reel spindle to be subsequently described. In the present instance this spring is mounted by forming suitable apertures through the hub of the respective pulley and the sleeve 33, the opening in the pulley being threaded and larger than the one through the sleeve, a screw 37 being screwed into the hub, and having a recess at its inner side in which a suitable spring 38 is set, bearing upon the pin 36, which is inserted through the opening in the sleeve, and provided with a head located in the larger passage in the hub. The sleeve 33 at the upper forward end of the stand is provided with a triple grooved pulley 39, from which the belt 40 is extended to a suitable pulley on the projecting machine, not shown, while the upper pulley 41 at the rear end of the stand is formed with a single groove in which there is fitted a belt 42 from the pulley 39. The upper pulleys, 39 and 41 are of the same size, and are to operate take-up reels, at the same rate of speed. The lower pulley 43 is smaller than the other two, driven by a belt 44 from the pulley 39, and used to operate a rewinder reel, as will be subsequently explained.

Within the housing 16 and suitably mounted therein in stationary position, there are guiding tracks 45, 46, formed integrally for use in the transfer of reels from one position to another while in operation. It comprises rail portions L-shaped in cross section, having one flange projecting outwardly at right angles to the rear side of the housing. The upper rail 45 has this outwardly projecting flange located slightly below the level of the opening through the sleeves 33, and at the forward side of the housing is formed with a hook portion 47, concentric with the aperture through the sleeve 33, and located immediately adjacent the sleeve 33. The flange of this rail at the opposite end terminates immediately adjacent the respective sleeve 33, and spaced toward the rear side of the aperture through this last mentioned sleeve there is the outwardly projected flange portion of the rail 46, which is formed at its lower end with a hook 48 concentric with the aperture through the lowermost sleeve 33 in the housing. The last mentioned flange at is upper end extends slightly above the aperture of the adjacent sleeve, and is slightly recurved concentrically therewith.

The reels for use with this device are preferably constructed as shown in Fig. 8, where the hub element 49 is formed of sheet metal, with a lateral enlargement 50 at one side providing a suitable key-slot, this hub being fitted in corresponding openings in the flanges of the reels, and the metal at the outer ends of the hub upset suitably to hold it firmly in place. A barrel portion 51 of suitable size for the winding of the film is located concentrically outwardly of the hub, being formed of a strip of sheet metal having a plurality of tongues 52 at the edges, this strip being bent into cylindrical form and the tongues inserted through suitable slots in the flanges and upset to sustain the barrel firmly in place and hold the flanges against separation. The sheet material is also pressed, stamped or otherwise operated upon to form raised nodules, teeth or spurs 53, spaced apart the same distance as the apertures at the sides of the moving picture film as at present constructed. For supporting these reels in the housing 16 there are provided spindle pins 54, of a suitable length to engage entirely through the hub and the sleeve 36. The pins are tenoned at their outer ends and each has engaged revolubly thereon a handle or knob element 55, held in place by a suitable knurled nut 56 outwardly thereof, between which and the knob there is confined a spring 57, the knob being suitably bored to accommodate the spring therewithin. The knob element 55 also carries a key 58, lying closely beside the body of the pin 54, for engagement in the slot extension 50 of the hub of the reel. Adjacent the opposite end of the pin, there are formed two grooves, 59 and 59', the one 59 being located closer to the end of the pin and extending entirely therearound, having rounded edges at each side, while the groove 59' is located a very short distance inwardly of the first groove, and extends only part way therearound. The last mentioned groove at one end terminates in an abrupt manner, while its opposite end portion is decreased gradually in depth until it coincides with the periphery of the pin 54, and the sides of this groove are not rounded. The pin is pointed, as illustrated, in order to facilitate its ready engagement through the sleeve 33 and beneath the spring pressed pin 36.

By inserting the pin 54 in a reel hub to its full depth, and presenting the pin in one of the sleeves 33 to the fullest extent, the groove 59' of the pin will register with the pin 36, which will thereby rotate the pin, carrying the reel with it, enabling the reel to wind the film as desired. When the reel is thus positioned in the forward sleeve in the upper part of the housing, and a film has been partly wound, when it is necessary to shift the reel in order to permit the introduction of a new empty reel for winding of a succeeding film, the operator may grasp the knurled nut 56 and give the pin a slight rotation in the direction of winding, which will bring the shallow part of the groove 59' beneath the pin 36 and permit withdrawal of the pin 54 with the attached reel. The pin is withdrawn just sufficiently to clear the sleeve 33, and with its point resting on the rail 45 is slipped along toward the rear, even pressure being maintained thereon, until the point slips into the opening of the rearmost sleeve 33, when the pin is forced inwardly to its innermost position, and the rotation of the reel will be thereby automatically begun as soon as the pin 36 engages the end of the groove 59' on the pin again. As soon as the reel is filled, and it is desired to rewind the film thereon, the operator again grasps the knurled nut 56, rotating the pin sufficiently to permit its disengagement, when the pin is drawn outwardly until the groove 59 therein registers with the pin 36, and in this position the pin will be held against further withdrawal, but permitted to rotate freely while the film on the reel is unwound. An empty reel being adjusted on the lowermost sleeve 33 upon a pin 54 engaged to its full extent in the sleeve 33, and a film connected thereto, a re-winding operation may be conducted, as will be readily understood.

An upper magazine 60 is provided, having a suitable mounting fitting 61 adapted to be secured upon the usual plate provided for that purpose upon moving picture machines, the magazine being oblong and having rounded ends, so that two reels may be located therein, one at each end. The magazine is preferably closed by two doors 62, opening toward respective ends of the magazine, and is braced at the rear side by a suitable frame 63, riveted or bolted thereto in any customary way. The frame includes boss portions 64 and 65 adjacent respective ends, suitably bored, the one adjacent the forward end of the magazine, and the other adjacent the rear end. In each there are mounted suitable spring pressed pins 66, as shown in Fig. 6, adapted to engage in the grooved portions of spindle pins 67, upon which reels 68 may be supported in the magazine. These pins may be constructed the same as the pins 54 before described, if desired. In the rear boss 65 of the upper magazine frame there is engaged a bushing 69, as shown in Fig. 6, through which the pin 66 projects. The pin 66 is mounted in a suitable hollow screw 70, engaged in the boss 65, as clearly shown in Fig. 6. The bushing 69 is flanged at its inner end and engaged revolubly thereon there is a segment 72 of a disk, having a grooved periphery, terminating on a chord intersecting the periphery at points approximately giving the periphery of the segments an arc of 230 degrees more or less. Mounted upon this segment opposite the chordal edge there is a plate 72, carrying a disk segment 73 conforming to the omitted portion of the segment 71, similarly grooved on the periphery, movable with the plate 72 into alinement with the first segment to form a complete disk having a continuous peripheral groove therearound. The plate 72 is continued radially beyond the periphery of the segment 73 and formed with an offset tongue 74 adapted to move inwardly through an aperture in the flange of a reel, as will be subsequently described. The plate 72 is suitably apertured to permit the insertion of a pin 67 therethrough. The disk segment 71 is also provided with a fixed key arm 75, extended through a suitable opening in the plate 72 and disposed closely beside the pin 67 when engaged in the bushing 69, being intended for engagement in the slot extension 50 of the reel hub. The reels for use with this appliance are each formed with an aperture 76 through the flange at each side, the aperture from a point a short distance beyond the periphery of the barrel 51 inwardly as far as required to permit the tongue 74 of the plate 72 to pass inwardly of the flange a short distance when no film is engaged around the barrel. The tongue 74 is of a length to bear against the edge of a film wound upon the reel, long as any film is wound upon the reel the plate 72 will be held outwardly from the reel and the segment 73 maintained in aline-ment with the segment 71. The back frame of the upper magazine is formed with a bracket arm 77 immediately adjacent the boss 65, extending upwardly and supporting a release lever 78 having one end bent inwardly toward the casing and extended through a suitable slot 79 in the rear side of the magazine, this end of the lever being bent so as to lie in alinement with the grooves of the segments 71 and 73 when in initial position. A suitable bill 80, having a rounded lower edge is formed on this end of the lever to ride smoothly in the grooves of the two segments when rotating. The plate 72 is spring pressed in any usual construction, so that when the segment 73 moves inwardly toward the reel the bill 80 will be permitted to move inwardly toward the axis of the reel into the space from which the segment 73 has been displaced. In the present instance, the plate 72 is simply hinged upon the segment 71 and a small torsional spring coengaged between the plate 72 and the segment at 81, Fig. 1. The plate 72 is beveled at one side preferably at that side which is toward the front end of the magazine when the arm 74 is extended upwardly, this beveling being for the purpose of permitting the end of a spindle pin to pass easily over the plate 72 to the opening in the bushing 69 when moved from the opposite end of the magazine. A guide rail 82, similar to the rails 45 and 46 before described extends from the opening through the boss 65 to lie closely beside the segments 71—73. The plate 72 is shown to have an enlarged circular part adapted to aline with the segments 71—73, although this particular shape is not essential.

The lever 78 at the end opposite the bill 80 is supported by a spring 83 resting upon a suitable lug 84 formed in the magazine frame 63 having a vertical bore therethrough receiving slidably a link 86 connected to the adjacent end of the lever, the link being connected at its lower end of a trigger arm 87, extended through a slot 88 in the magazine closely adjacent the bottom thereof from a film holding and starting device, illustrated in full size in Figs. 4 and 5, and located upon the inner side of the bottom of the magazine, adjacent the middle of the magazine.

The film holder and starter device is in the present instance made in a unit conveniently for removal, and comprises a frame plate 90 having upturned parallel side portions 91 between which adjacent one end there is mounted a feed sprocket 92, of the customary size and form immediately inward of which a slot 93 is formed through the central portion of the plate, forming the outlet for films from the upper magazine. Mounted in a suitable manner upon each side of the frame 90, there are keeper hooks 94, pivoted in the present instance at the far side of the sprocket from the aperture 93, and extending beside the frame plate to a point adjacent the inner side of the sprocket, where they are provided with bills 95, the outer parts of which are inclined toward the sides 91, the inner sides of which are adapted to lie close beside the sprocket between the teeth, to hold a film end close against the sprocket to engage through the apertures of the film in the customary manner. These keepers 94 are formed with extensions at their inner parts, between which there is connected a suitable spring 96 by which they are held at the inner limit of their movement with the bills closely adjacent the sprocket. Finger pieces 97 are formed on the keepers, so that by pressing the finger pieces toward each other the bills will be moved outwardly from engaged position. The sides 91 of the frame plate are offset outwardly a slight distance immediately adjacent the slots 93, and sprockets 92, and are longitudinally slotted, as at 98, to receive the trunnions 99 of a guide roller 100, alined with the sprocket 92 and movable into engagement therewith at times. A yoke 101 has opposite arms engaged with the trunnions of the roller, which is provided with outwardly extending rods 102, engaged slidably through an upturned tongue 103 on the plate 90, between which tongue and yoke there is confined a spring 104, under compression, and tending normally to force the yoke inwardly and carry the roller 100 into engagement with the sprocket 92. A trigger 105 is pivoted on the shaft of the sprocket 92, comprising a suitably formed plate extending upwardly from the shaft and thence inwardly to a point immediately adjacent the slot 88 in the back of the magazine, and having a bill 106 at the lower side engaging the adjacent trunnions 99 of the roller 100, to prevent movement thereof inwardly toward the sprocket 92. The keeper 94 adjacent the trigger is suitably recessed at its inner side to pass beside the trigger without interference therewith, and the arm 87 of the trigger is extended upwardly and bent rearwardly so as to pass through the slot 88 in the rear side of the magazine, as before mentioned. The roller 100 is beveled at each end, so that in moving to the sprocket 92 it slides upon the inclined parts of the keepers 94, moving them outwardly.

Attached to the under side of the magazine there is a guide plate 107, having a downwardly extending portion 108, immediately adjacent the forward side of the outlet opening or valve of the magazine, the plate being recurved upwardly adjacent the upper feed sprocket 109, and being cut away at each side so that it may lie over the hub portion of the sprocket and between the flanges thereof, being then extended downwardly and rearwardly a short distance from the feed sprocket, so as to project into the space about which the upper loop is ordinarily formed in the film, as shown at 110 in Fig. 1. In this view there is a formal showing of the feeding mechanism and intermittent sprocket of a moving picture machine of a well known type, together with the aperture plate 111, below which the intermittent sprocket 112 is indicated as well as the lower feed sprocket 113, disposed slightly below and to the rear of the intermittent sprocket. A guide plate 114 is pivoted in a suitable manner immediately adjacent the lower side of the intermittent sprocket 112, suitably curved to conform to the largest size of loop desired in the film at the lower side of the intermittent sprocket, its outer end being located closely adjacent the lower feed sprocket 113, and directed upwardly in a suitable manner, as will be subsequently understood. Suitably located to receive a film from the lower feed sprocket 113, there is a guide chute 115, leading to the inlet or valve of the lower magazine. This chute is suitably formed with a narrow upper back portion to extend into the sprocket 113, and a similar lower portion extending slightly past a propelling sprocket 116, mounted upon a suitable bracket frame 117 secured in position suitably immediately over the opening into the lower magazine.

The bracket frame 117, illustrated in detail in Fig. 8 is formed in two parts, one comprising a body portion 118, extending vertically, integral side portions of L-shape being bent into right angles therewith, short arms at the sides bearing the sprocket 116, the vertical portion being located immediately adjacent the forward side of the opening into the magazine, and extending downwardly therethrough. Immediately adjacent the sprocket 116, a guide roller 120 is mounted between the sides of the plate 118, bearing against the sprocket 116, or closely adjacent thereto. Between the sides of the plate a bracket plate 121 is engaged, having upturned ears 122 riveted to the sides of the bracket 118, and an inner guide tongue 123, parallel to and slightly spaced from the vertical body portion of the plate 118. The plate 121 is adapted to be engaged to the upper side of the magazine or the table piece 19 of the stand, as desired, and a bracket block 124 is attached to the outer side of the plate 118 also adapted to be secured to the stand or magazine top. The sides of the plate 118 extend into the magazine a short distance and carry a guide roller 125, and mounted immediately forwardly thereof there is a swinging chute 126, hinged upon the block 124, as shown in Figs. 8, 9, 10, and 1. This chute is formed from sheet metal, comprising a bottom portion pressed suitably to form raised guide rails 127 at each side, the edge portions 128 being turned upwardly at right angles to the bottom and tapered from each end outwardly, as clearly shown in Figs. 8 and 9. The chute is so hinged that its upper end lies closely adjacent the lower end of the plate 118 without any intervening space below the plate 118. A suitable door 129 is hinged at one side of the chute, so as to permit ready access thereto when desired. The door in the present instance is engaged with the chute, and is provided with a projecting lip 130 at its upper end so that pressure of the thumb thereagainst will readily open the door. The bottom of the chute is extended longitudinally beyond the sides, as shown at 131, and slightly curved inwardly—that is, toward the adjacent reel mounting. The outer end of the chute swings in an arc, a projection of which passes below the barrel of the reel C mounted in the upper forward part of the lower magazine. The end of the chute is nearly or quite concentric with the barrel when in engaged position, as illustrated in Fig. 8 and dotted in Fig. 1. Pivoted on its extension there is a curved plate 131, also concentric with the barrel of the reel when in engaged position, and pivoted in this plate in turn there is a gate piece 132, curved in an arc of about 170 degrees, extending at its outer end in nearly two lines with the door 129, the outer end being recurved outwardly and extended parallel with the bottom of the chute a fixed distance to rest against the outer side of the door 129 when the device is in engaged position.

At each of the connections between the plate 131, and the chute and gate piece, suitable springs 134 are incorporated, under tension normally tending to move the parts into closed position as illustrated in Fig. 8, the springs being quite light and exerting only slight force in the direction indicated. On the back of the lower end of the chute, a guide lug 135 is formed, having an opening therethrough of a size and shape to receive slidably and for oscillation a lever link 136, connected pivotally at its outer end to the back of the gate piece 132 immediately adjacent its hinge connection with the plate 131. A gripping block 137 is pivoted on the inner end of the lever 136, in which there is secured the outer end of a spring 139, extended slidably through a suitable guide 139, secured to the under or outer side of the bottom of the chute 126, this guide extending as far as possible outwardly on the chute without interfering with the movement of the lever as will be subsequently described, and stopping short of the pivoted end of the chute a short distance, as indicated in Figs. 8 and 9.

Suitably mounted at the upper side of the magazine at the forward part spaced a suitable distance forwardly of the pivot of the chute 126, there is a spring casing 140, in the present instance comprising a block having a circular chamber 141 formed therein and provided with flanges at opposite sides by which it may be attached to the underside of the table piece of the stand, or the upper side of the magazine as the case may be. An outlet opening 142 is formed from this chamber, toward the chute 126, and the spring 139 is passed through this opening and attached in a suitable manner to a circular block 143, of a size somewhat smaller than the diameter of the chamber 141, the blocks being secured upon a shaft 144 engaged revolubly in the rear side of the block 140, and also supported revolubly in a cover piece 145, secured upon the block 140 over the chamber 141, a barrel 146 being formed on this cover around the shaft 144, having a notch 147 therein at the upper side in which a latch lever 148 may be engaged to hold the shaft 144 against turning, and keeping the spring 139 either retracted or projected, as desired. The shaft 144 is extended outwardly through the front side of the lower magazine, and provided with a hand wheel 148, upon the hub of which the lever 147 is pivoted. A pin 149 is mounted upon the shaft 144, extending through the lever 147 in the plane of its oscillation, the pin having a head on its outer end, between which and the lever there is confined a spring 150, by which the lever is pressed inwardly so as to bear upon the hub 146 normally and engage in the slot automatically as soon as the lever registers with the slot. At its outer end, the lever 147 is formed with a release arm 151, extending outwardly from the hub of the hand wheel longitudinally a short distance, being recurved immediately adjacent the rim of the wheel, where it is engaged by a push button 152, mounted in the rim of the hand wheel, and by which the lever 147 may be released for rotation of the shaft 144 when desired.

For vertical adjustment of the stand, a worm screw 154 is mounted revolubly in the base frame 11, at the rear side, and threaded in a suitable boss 155 formed in one of the triangular reinforcing elements 17 of the upper part of the stand, at the rear of the lower magazine. This screw is provided with a hand wheel 156, by which it may be manipulated when set screws 157 at the corners of the stand are loosened, as will be readily understood.

In operation, the operator having at hand the films to be exhibited, introduces the first film upon the reel A at the rear of the upper magazine, and threads it through the projecting machine in the customary manner, leading the film to the reel D in the lower magazine, at the rear upper part thereof. The machine being motor driven as illustrated, the operator may then start the projection of the first film. While this film is being displayed, the reel B is introduced at the forward end of the upper magazine, and its outer end lead to the sprocket 92 of the starter device, the film being grasped in one hand while the other is used to press the finger pieces 97 of the keepers 94 so that the film may pass freely before the sprocket 92, the end of the film being extended sufficiently to pass through the slot 93 and from the magazine a short distance, before the plate 108, where it is allowed to rest while it is pressed upon the sprocket 92 until the teeth thereof properly engage with the film, after which the keepers 94 are released, in which manner the film will be held upon the sprocket 92 and clear of the film from the reel A as it is fed through the machine for projection. The hand wheel 148 is then turned to project the spring 139, to bear against the under side of the chute 126, causing it to swing toward the hub of the adjacent reel D, as before mentioned. The chute is checked as soon as it reaches the hub, and continued pressure by the spring 139 bears upon the lever 136, causing a pivotal movement thereof in the guide lug 135, causing first an inward pivotal movement of the plate 131, after which the lever begins to slide in the guide, continuing its pivotal movement at the same time, and bearing the gate 132 upwardly and inwardly toward the chute, until the tongue 136 rests against the door of the chute, at which time the small springs 134 become most effective to hold the device in closed position, and at which time the lever 147 registers with the notch in the sleeve 146, snapping thereinto and holding the device in proper position. During this time the machine is in continuous operation displaying the first reel. As soon as the end of the first film leaves the reel A, this permits the swinging plate 72 to move inwardly through the apertures 76 in the side of the reel, displacing the segment 73 from the plane of the bill 80 of the lever 78 mounted upon the back of the upper magazine, permitting the spring 84 to raise the link 86, which releases the trigger 105. The spring 104 then propels the roller 100 toward the sprocket 92 of the starting device, the film in course of exhibition being still in progress over this roller, the roller bearing the keepers 94 outwardly and carrying the departing end portion of the film against the sprocket 92, adjacent the teeth thereof, and causing its rotation. This initiates movement of the second film from the reel B, the plate 108 guiding the propelled end of the second film into engagement with the upper feed sprocket 109, from which the extremity of the plate 108 directs the end of the second film into the upper loop of the film being exhibited. From this point the end of the second film is guided by the usual appliances in the machines before the aperture plate 111, which is ordinarily so located with respect to the intermittent sprocket 112 as to direct the end of the film correctly thereto, the first film in all of these movements serving to prevent the end of the second film from passing rearwardly out of the proper path. Below the intermittent sprocket 112 the curved plate 114 guides the film properly in looped form to the lower feed sprocket 113, from which it passes into the chute 115. At the lower end of this chute it is engaged by the sprocket 116, which is also engaged with the first film, by which it is rotated and the second film is thereby projected properly into the chute 126, by which it is guided to the hub of the reel C. This reel is rotating at a greater rate of speed than the film as it leaves the projecting machine, and as the end of the film is directed around the barrel of the reel, the teeth 53 of the barrel quickly engage the end of the film, and tighten it upon the barrel, beginning the winding of the film. The guide chute 126 may be left in closed position for a time after the second film begins to wind upon the takeup reel C, and may then be swung to disengaged position by exerting pressure upon the button 152 and rotating the hand wheel 148 until the chute is drawn into full disengaged position, as illustrated in full lines in Figs. 1 and 9, at which time the lever 147 is again in position to engage the sleeve 126, whereby the device will be held in disengaged position until the reverse operation is performed for a succeeding film.

It will be observed that the second film is now in course of exhibition, without the necessity for the stopping of the machine, and the machine may be permitted to continue operation, while the operator adjusts the first film upon the rewinder reel E, at the bottom of the lower magazine. As soon as the exhibition of the first film has been concluded, and all of it taken up by the reel at D, the operator grasps the knurled nut 56 of the pin therein, giving it a turn in the direction of take-up, which permits the pin to be withdrawn. The pin is drawn outwardly a short distance, until the spring pin 36 engages the outer groove 59 in the pin 54, which retains it for rotation while the film is being rewound. The end of this film is then engaged with the empty reel E in the lower part of the magazine. The rewound first film is then removed from the lower part of the magazine and an empty reel put into position. If desired, a feed device such as that shown at Figs. 8 and 9 may be located in the bottom of the magazine to direct the film from the reel D to the rewinder reel E, this being an obvious expedient which it is thought not necessary to illustrate.

At this stage of the operation the film being displayed will be delivered from the reel B at the forward side of the upper magazine. The operator may now move the empty reel from the rear side of this magazine, at the same time turning the plate 72 until the arm 74 extends upwardly, with the finger raising the end of the lever 78 and pressing the arm 74 rearwardly until the bill 80 may rest in the groove of the segment 73, then lowering the lever 78 whereby the plate 72 is retained in set position. Without stopping the machine, the operator may then grasp the head of the pin 67 upon which the reel B is carried, withdrawing the pin sufficiently to free it from the spring pin 66, until only the end of the pin rests upon the guide rail 82. The reel may then be moved slidably to the clear end of the magazine, and the pin inserted through the plate 72 into engaged position with the pin 66 projected through the bushing 69. A new full reel may now be put into position in the upper magazine, and the film end engaged with the starting device as before described. The machine is now ready to automatically begin the starting of the third film whenever the second film is concluded. By this time the first film will have been rewound upon the reel E, and the reel D will have been emptied. This last named reel is now removed from the lower magazine in order to do which the operator grasps the knurled nut 56 on the outer end of the pin 54, giving it a slight rotative movement in the direction which the film is being wound, which moves the shallow part of the groove 16 into position under the pin 36, permitting the pin 54 to be withdrawn. The pin 54 of the reel C is similarly manipulated, and moved inwardly along the guide rail 45 until it may be engaged in the sleeve 33 at the rear upper part of the lower magazine, when the pin 54 is thrust inwardly until again engaged for rotation, the take-up of the second film being discontinued. The emptied reel previously removed is then put into position at C, and the hand wheel 148 operated to move the swinging chute into position for directing the third film into engagement with the take-up reel, when the second film is terminated.

In claim 17, the word "propel" is used in its strict sense of the verb, implying the movement of a film end in advance of the propelling means, in distinction to the ordinary feeding apparatus in picture machines, which involves means to pull forward a film in train behind the film moving mechanism.

What is claimed:

1. A machine for enabling the repeated and continuous display of a series of reels of picture film, comprising a projecting machine, an upper magazine, a plurality of reel mountings therein, guideways from one to the other, reels removably engaged therewith having members slidable on said guideways, means to hold the initial end of a film from one reel, means controlled by the terminal end of the film from the other reel to move the film from the said one reel into the projecting machine, means to guide the film through the projecting machine, a receiving magazine having a plurality of winding reel mountings therein, guide means extending between said mountings, means to rotate two of the mountings at a predetermined speed, means to rotate another at a greater speed, means to receive and guide the propelled end of a film from the projecting machine to one of the first named reel mountings in the receiving magazine, reels removably engageable with said mountings, and means to manipulate the reels in said magazines while rotating, including an element slidable on the said guideways.

2. A machine for enabling the repeated and continuous projection of a series of reels of picture film, comprising a starting magazine, a plurality of reel mountings therein, reels removably engaged with the mountings, means to transfer the reels from one mounting to the other, means to hold the initial end of a film from one reel, means controlled by the terminal end of a film from the other reel to move the first mentioned film, and means to guide a film into engagement with feeding devices of a projecting machine.

3. A mechanism for the purposes described including a web holding means, means to propel the web, normal draw feeding devices, guide means associated therewith to direct the propelled end of a web to the feeding devices, reeling means for a drawn web, separate reeling means for a propelled web, guide means to receive a propelled web from the feeding devices constructed for and movable into loose embracing relation with the second named reeling means, and means controlled by the terminal end of a drawn web to operate said holding and propelling means.

4. In a machine for the purposes described, a threading means including a train of feeding sprockets, a drawn web carried therethrough, means to guide a second web to the beginning of the train, and guide elements for the second web opposed to and conforming to the convex surfaces of certain bends in the drawn web.

5. In a machine for the purposes described, a reel film controlled member associated therewith normally tending to lie within the space for wound material, and movable to permit winding of material thereon, a trigger controlled film starting device, and connections between the film controlled member and the trigger of the film starting device.

6. In a machine for the purposes described, a reel film controlled member associated therewith normally tending to lie within the space for wound material, and movable to permit winding of material thereon, a film starting device, and connections between the film controlled member and the film starting device.

7. In a machine for the purpose described, a film starting element, a delivery reel, a spindle pin therefor, said reel in-having a reel slot, a mounting for the reel constructed to receive said pin, a revoluble member in the form of a segment of a disk carried by said mounting concentrically with the pin, a second segment movable laterally with respect to the first segment for alinement therewith to form a complete circular element at times and having a resilient mounting on the first segment, a spring pressed member arranged to bear on the peripheral portions of the said segments when alined, connections between the spring pressed member and the starting element, said reel being open at the side and a member on the second named segment movable through the open side of the reel to engage the edge of the film wound on the reel.

8. In a machine for the purposes described, a film starter device, a reel, an element associated therewith movable transversely of the reel and positioned to be held at one limit of its movement by film wound upon the reel, means normally tending to move said member to the opposite limit of its movement, and connections between said member and the film starter device.

9. In a machine for the purposes described, a film starting device, a reel having an open side, a concentric disk segment associated therewith, having a groove in its periphery, a second disk segment adapted for alinement therewith to form a complete circular element and similarly grooved, means normally tending to move the last named segment laterally, a film engaging member carried by the last segment to hold it in initial position under engagement of a film, a lever element having a portion movable to engage in said grooves, yielding means tending to move the lever and connections between said lever and the starting device.

10. In a machine for the purposes described, a film starting device, a reel support including a spindle element, a concentrically revoluble member carried by the support having a key extended longitudinally beside the said spindle, a reel having a key slot engaged on the spindle and with said key, and having an opening in the side, a member movable through said opening to engage a film on the reel, and connections between the last named member and the film starting device.

11. In a machine for the purposes indicated, a framing, a sprocket revolubly mounted thereon, means to hold a film end thereagainst releasably, a member movable toward and away from the sprocket to bear a moving film thereagainst at times, and film controlled means to operate said member.

12. In a machine for the purposes indicated, a sprocket, means to hold a film thereagainst releasably, and having beveled divergent portions presented outwardly from the sprocket, a fender element movable into engagement with the sprocket and for separation of said divergent portions to release said means to hold a film, and film controlled means to move said fender element.

13. In a machine for the purposes described, a frame, a sprocket, a yoke member slidably mounted on the frame movable toward and away from the sprocket, a roller carried by the yoke to engage the sprocket means to hold a film end on the sprocket between the sprocket and roller and operatively associated with the latter to be moved into disengaged position thereby under movement to the sprocket, and film controlled means to move the yoke against the sprocket.

14. In a machine for the purposes described, a frame, a sprocket revoluble thereon, a roller resiliently mounted for yielding movement against the sprocket, means to hold a film end upon the sprocket between the roller and sprocket, and a film controlled trigger device to hold the roller in disengaged position.

15. In a machine for the purposes described, a frame, a sprocket revoluble thereon, a roller mounted for movement against the sprocket, keeper members movable longitudinally of the sprocket adjacent each end to extend inwardly thereover a distance and having divergent outer portions to be engaged and fended outwardly by said roller, and film controlled means to move the roller.

16. In a machine for the purposes described two feed reels, a projecting machine, a film on one reel threaded through the projecting machine, means to propel and guide a second film from the other reel through the projecting machine, two take up reels, said first named film engaged with one, and means to direct and apply the second film end to the other take up reel when propelled through the projecting machine.

17. In a machine of the character described, the combination of a motion picture projecting machine including means to propel a film end therethrough, a take up reel having a film engaging means, and means to guide a propelled film end into a volute therearound.

18. A mechanism for the purposes described including a web holding means, means to propel the web, normal draw feeding devices, guide means associated therewith to direct the end of a propelled web to the feeding devices, reeling means for a drawn web, separate reeling means for a propelled web, means to direct and apply a propelled web end portion to the second named reeling means, and means controlled by the terminal end of a drawn web to operate said holding and propelling means.

19. In a machine for the purposes described, a projecting machine a starting reel magazine a plurality of reel mountings therein, means associated therewith to hold the initial end of a film from one reel, means controlled by the film from another reel to move such said film end into the projecting machine, means to guide a film end through the projecting machine, a receiving magazine having a plurality of take-up reel mountings reels therefor, and means to direct and apply a film end from the projecting machine to a reel on one of the last named mountings.

20. A mechanism for the purposes described including a web holding means, means to propel the web, normal draw feed devices, guide means associated therewith to direct the propelled end of a web to the feeding devices, reeling means for a drawn web, separate reeling means for a propelled web, means to direct and apply a propelled web to the said separate reeling means, and drawn film controlled means to operate said holding and propelling means.

21. In a machine for the purposes described, a support for a first film, a support for a second film, one of said supports being a toothed sprocket and one of said supports being movable to present the film in common engagement with said sprocket and means controlled by said first film to move said movable support.

In testimony whereof I have affixed my signature in presence of two witnesses.

PETER R. GONSKY.

Witnesses:
H. L. WOODWARD,
CHRISTIAN NIELSEN, Jr.